United States Patent
Gallestey et al.

(10) Patent No.: US 7,266,416 B2
(45) Date of Patent: Sep. 4, 2007

(54) PROCESS CONTROL SYSTEM

(75) Inventors: Eduardo Alvarez Gallestey, Tägerig (CH); Alec Stothert, Westborough, MA (US)

(73) Assignee: ABB Research Ltd, Zurich (CH)

(*) Notice: Subject to any disclaimer, the term of this patent is extended or adjusted under 35 U.S.C. 154(b) by 237 days.

(21) Appl. No.: 11/019,208

(22) Filed: Dec. 23, 2004

(65) Prior Publication Data

US 2005/0154476 A1 Jul. 14, 2005

(30) Foreign Application Priority Data

Jan. 9, 2004 (EP) .................................. 04405017

(51) Int. Cl.
*G05B 13/02* (2006.01)
(52) U.S. Cl. ....................................................... 700/44
(58) Field of Classification Search ................. 700/49, 700/44, 31, 29, 30, 34
See application file for complete search history.

(56) References Cited

U.S. PATENT DOCUMENTS

| | | | | | |
|---|---|---|---|---|---|
| 5,347,446 | A | * | 9/1994 | Iino et al. | 700/29 |
| 5,351,184 | A | * | 9/1994 | Lu et al. | 700/45 |
| 6,056,781 | A | * | 5/2000 | Wassick et al. | 703/12 |
| 6,373,033 | B1 | * | 4/2002 | de Waard et al. | 219/497 |
| 6,438,430 | B1 | * | 8/2002 | Martin et al. | 700/28 |
| 6,823,675 | B2 | * | 11/2004 | Brunell et al. | 60/773 |
| 6,925,338 | B2 | * | 8/2005 | Eryurek et al. | 700/30 |
| 2003/0028265 | A1 | | 2/2003 | Martin | |
| 2005/0137721 | A1 | * | 6/2005 | Attarwala | 700/30 |

OTHER PUBLICATIONS

European Search Report dated May 12, 2004 in European Appln. No. 04405017.7.
Ilgen et al., "Expert System as an Operator Interface for Advanced Controls," *Proceedings of the Industrial Computing Conference*, Chicago, Sep. 19, 1993, pp. 265-276, vol. 3, ISA, USA.
Hagemoen, "An Expert System Application for Lime Kiln Automation," *Pulp and Paper Industry Technical Conference*, 1993, Jun. 21, 1993, pp. 91-97, Conference Record of 1993 Annual Hyannis, MA, IEEE, NY, NY.
Clark, "Expertly Controlled," *World Cement*, Jan. 2002, vol. 33 No. 1, Switzerland.
Bemporad et al., "Control of systems integrating logic, dynamics, and constraints," *Automatica 35*, 1999, pp. 407-427, Elsevier Science Ltd.

* cited by examiner

*Primary Examiner*—Thomas K. Pham
(74) *Attorney, Agent, or Firm*—Buchanan Ingersoll & Rooney PC

(57) ABSTRACT

The disclosed process control system makes use of Optimal control (OC) and model predictive control (MPC) techniques for selection of the Expert Systems (ES) targets values U. The ES target values U are selected to minimize the performance criterion J. A mathematical model of an extended system given by the process P and the ES is developed. This hybrid mathematical model has both continuous dynamics and logical relationships. Controlled variables of the mathematical model are the ES target values U and inputs are the measurements y and the performance criterion J. The OC and/or MPC techniques are used to compute values U. An optimizer of the OC/MPC selects values of the ES target values U only. This activity has lower sampling rates than selection of controller values, which simplifies the design of the OC/MPC controller.

3 Claims, 1 Drawing Sheet

PROCESS CONTROL SYSTEM

FIELD OF THE INVENTION

The invention relates to the field of advanced modeling techniques for industrial process control systems used in the mineral industries.

It relates to a process control system according to the preamble of claim 1.

BACKGROUND OF THE INVENTION

Optimal control (OC) and model predictive control (MPC) are important tools in modern control technology. They make possible a whole range of procedures for process control, monitoring, planning, scheduling, optimization, etc. Their application is based on the design of a mathematical model, for instance of the form $$dx/dt = f(t,x,u)$$
$$0 = h(t,x,u), \quad (1)$$

and an optimisation functional $$J[x(0),u(\cdot)] = \int f_0(\tau,x(\tau),u(\tau))d\tau \quad (2)$$

where x is the system state and u is the controlled variables.

OC and MPC work by minimizing the functional J (2) with respect to $u(\cdot)$ subject to the constraints given by Equation 1, see FIG. 1. OC/MPC based controller are useful when complex process and performance measures are considered and finding the optimum strategy is nearly impossible using "just" intuition.

On the other hand, expert systems (ES) based process control belongs to another family of ideas. Here no mathematical model of the form (1) is constructed explicitly, but a system of rules is developed, which if followed correctly is able to keep the process variables between certain bounds or near to predefined target values. These rules have their origin in best operating practices or in other words, operator experience. A successful example of such an expert systems is ABB's Expert Optimizer for kiln control, as described in "Expertly Controlled", WORLD CEMENT, Volume 33, Nr. 1, Jan. 2002.

ES are efficient in situations where operator experience is available on how to keep the process in certain bounds or near certain targets. FIG. 2 displays the situation: measurements y and process targets U are fed to the expert system ES. Then, ES follows its rule system and manipulates the controlled variables C to keep the process as close as possible to the targets U. Note that so far the performance criterion J does not play a direct role on the way the plant is operated.

Both approaches have virtues and drawbacks. OC and MPC rely on a good process models and on the performance (speed) and reliability of the optimizer (i.e. algorithm for finding the argmin of $J[x(0),u(\cdot)]$). One of the expert systems drawbacks is related to difficulties to maximize performance of complex processes in a systematic way.

OC, MPC and ES algorithms are implemented in computer programs, in which given process measurements drive the process in an automatic way via feedback.

DESCRIPTION OF THE INVENTION

It is an object of the invention to create an improved process control system for operation of industrial plants.

These objects are achieved by a process control system according to claim 1.

The inventive process control system uses mathematical model techniques for selection of the ES targets U. U is selected in such a way that the performance criterion J is minimized. Controlled variables of the mathematical model are the ES targets U and inputs are the measurements y and the performance criterion J. The mathematical model uses OC and/or MPC techniques to compute U.

The inventive process control system allows the optimizer of the OC/MPC application to operate at a lower sampling rate compared to process control systems with standard OC/MPC applications.

The inventive process control system leads to an improved economic performance of industrial plants.

BRIEF DESCRIPTION OF THE DRAWINGS

The subject matter of the invention will be explained in more detail in the following text with reference to the attached drawings, in which.

DETAILED DESCRIPTION OF PREFERRED EMBODIMENTS

Figure 1:
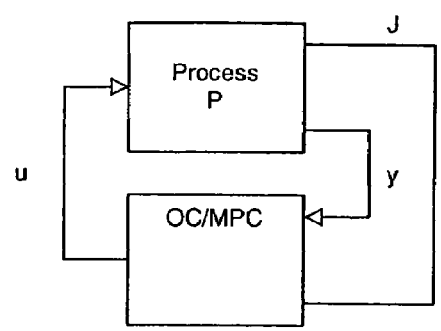
FIG. 1 shows an Optimal Control/Model Predictive Control Setup.
Figure 2:
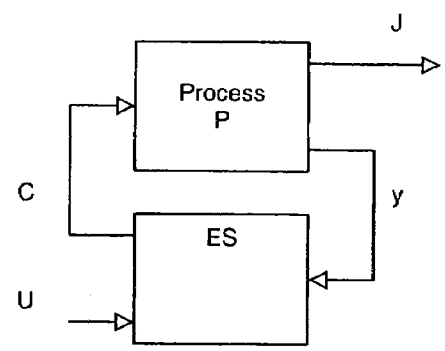
FIG. 2 shows an Expert System Setup.
Figure 3:
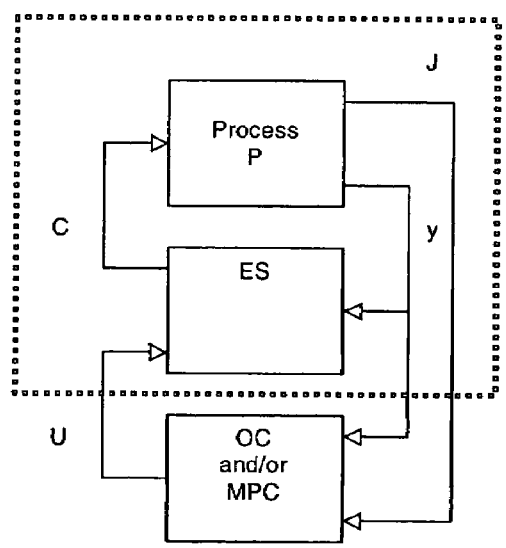
FIG. 3 shows the inventive setup.

The inventive process control system makes use of OC and/or MPC techniques for selection of the ES targets U. The ES target U is selected in such a way that the performance criterion J is minimized. In other words, a mathematical model of extended system given by the process P and the ES is developed. This mathematical model has hybrid nature in the sense that both continuous dynamics (mostly process) and logical relationships (mostly ES) appear in it. Controlled variables of the mathematical model are the ES targets U and inputs are the measurements y and the performance criterion J. Now, OC and/or MPC techniques are used to compute U, see FIG. 3.

One of the main advantages of the inventive process control system is reflected in the following fact:

In a standard OC/MPC application the optimizer would need to select the controller values C in real time. This situation puts high stress on the system and imposes high requirements on its reliability. With the setup of the inventive process control system the optimizer selects values of the ES targets U only. This activity has lower sampling rates than selection of C, which makes the design of the OC/MPC controller easier or even feasible. Moreover, constructing the associated mathematical model is also easier because it maybe possible to neglect phenomena with fast time constants.

Preferably the Mixed Logical Dynamical (MLD) system approach (see Bemporad A. and M. Morari: "Control of systems integrating logic, dynamics, and constraints"; Automatica; Special issue on hybrid systems, Vol. 35, n.3, p.407-427, 1999) is to be used for the modeling of the extended system "Plant+ES". It is obvious however that these mathematical models could be constructed using first principles methodologies, black box techniques or any combination thereof.

Another advantage of this approach is that upgrading of classical (heritage) ES control schemes becomes easy. Indeed, using this hierarchy of controllers ES control performance can be influenced and shaped to meet different performance criteria, extending the useful life of the "old" systems In a further embodiment of the inventive process control system, several layers of the scheme described above could be put in place to optimize the process control. In that case an ES is supervised by an OC/MPC based controller, which in turn is supervised by another ES, etc. This architecture allows optimal exploitation of the advantages of each approach for each particular task.

For further illustration, the inventive process control system is now described in the concrete case of a cement kiln.

Often one of the targets for kiln control expert systems is the temperature in the burning zone (BZT). There are rules that indicate to the ES how to keep the system close to this constant target. On the other hand, OC/MPC controllers have been designed to supervise the clinker chemistry.

Now, let us consider a situation where the mathematical model detects a situation where relatively cold feed is about to arrive to the burning zone with a high potential risk of low BZT values. In that instance, the OC/MPC controller, which monitors the effect of temperature on clinker quality, is likely to change the target for BZT to a higher value some sampling times before this happens. As a result, the optimal process temperature is not affected.

In another example, an OC/MPC controller reduces the target for raw feed rate in order to meet certain emission rate constraints, or in some special conditions, to increase the usage of certain low quality (calorific value) alternative fuels.

While ES systems are rather concerned with process stability, the OC/MPC systems take care of "optimality" in some sense, e.g. they drive processes to their economically optimal point. In the inventive process control system, the performance criterion J is therefore preferably related to some sort of economic performance measure.

The inventive process control system can also be applied in waste incineration plant control.

The invention claimed is:

1. A process control system, comprising
an expert system that models the actions of an operator of the process over an operating region of the process, that represents a set of rules for actions to be taken by an operator upon the occurrence of predetermined conditions in the operation of the process in order to meet given process targets, and that takes the action when one of the predetermined conditions exist to control the operation of the process by changing one or more of process control variables that control the process following the set of rules; and,
a model predictive control system that is operable to receive inputs representing measured variables of the process and to predict on an output of the model predictive control system predicted control values for controlled variables that control the process;
wherein the model predictive control system and the expert system are series connected in such a way that predicted control values of the model predictive control system serve as process targets for the expert system.

2. The process control system of claim 1, wherein the model predictive control system controlling the process targets for the expert system is supervised by another expert system.

3. The process control system of claim 2, wherein several layers of model predictive control systems and expert systems are series connected.

* * * * *